United States Patent [19]
Valente et al.

[11] 3,787,947
[45] Jan. 29, 1974

[54] AUTO SPACE MECHANISM FOR FABRICATING APPARATUS

[75] Inventors: Raymond L. Valente, Kankakee; Otto A. Bonomo, Matteson, both of Ill.

[73] Assignee: Manco Mfg. Co., Bradley, Ill.

[22] Filed: Sept. 12, 1972

[21] Appl. No.: 288,256

[52] U.S. Cl. .......... 29/208 C, 29/208 D, 29/200 P, 29/155
[51] Int. Cl. ............................................ B23p 19/04
[58] Field of Search... 83/50; 29/208 C, 155 R, 29/208 D, 200 A, 200 P

[56] References Cited
UNITED STATES PATENTS
3,712,161  1/1973  Valente .................................. 83/50

*Primary Examiner*—Thomas H. Eager
*Attorney, Agent, or Firm*—Roy H. Olson et al.

[57] ABSTRACT

A machine is disclosed herein for effecting fabrication of structural members, or the like, the machine comprising a work station having tooling means, drive means for advancing the structural member longitudinally of said work station, and apparatus for properly positioning the tooling means with respect to a predetermined location at which tooling operations are to be performed on the structural member. The positioning apparatus includes an indexing arrangement, as well as gauge means which permits automatic operation of the machine, such that tooling means may be initially positioned with respect to a transverse axis of the structural member and then moved along this axis in short, controlled increments to and from the points at which the tooling operations are to be performed. The tooling means are positioned in response to the energization of a stepping motor controlling the short, controlled increments of movement.

4 Claims, 3 Drawing Figures

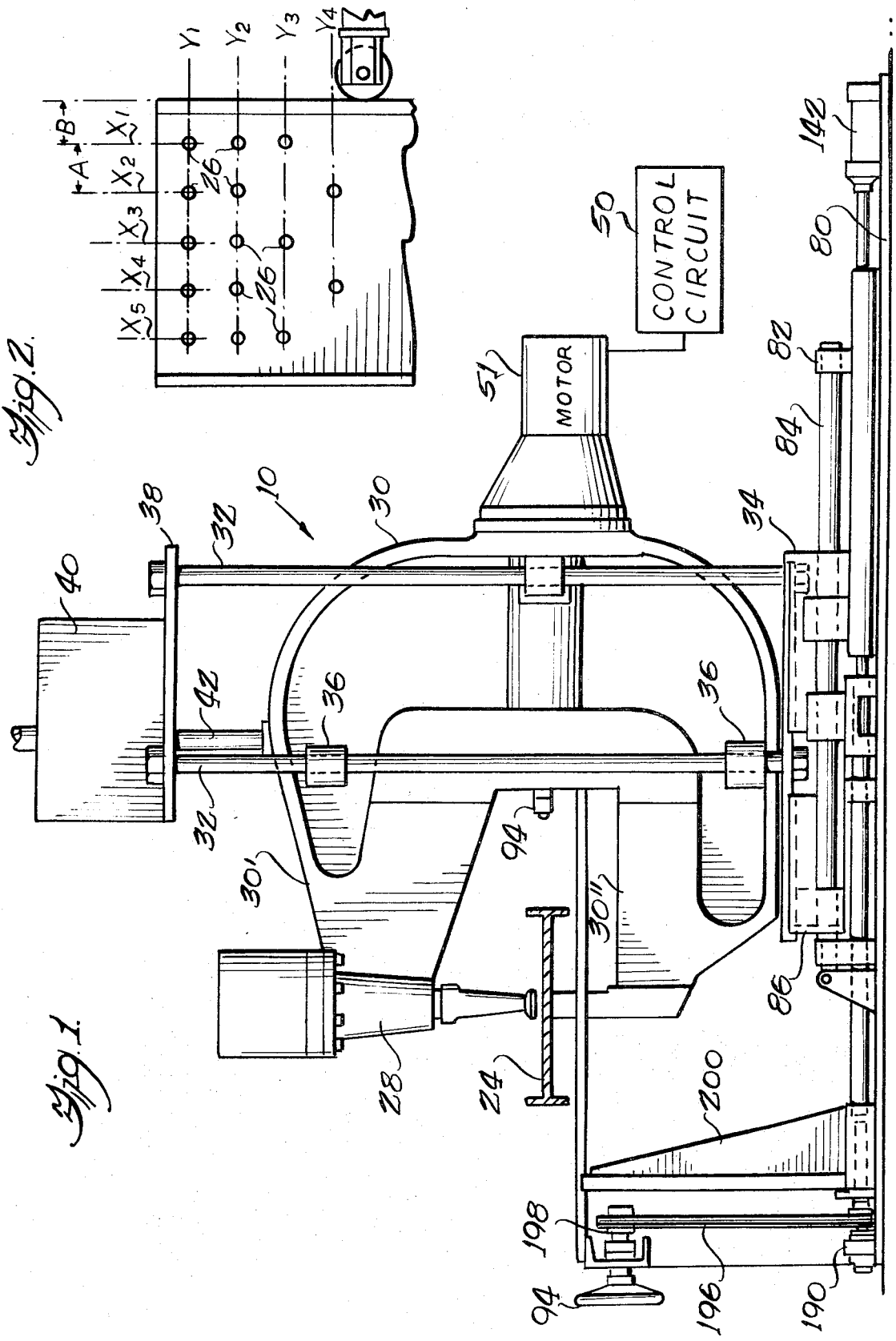

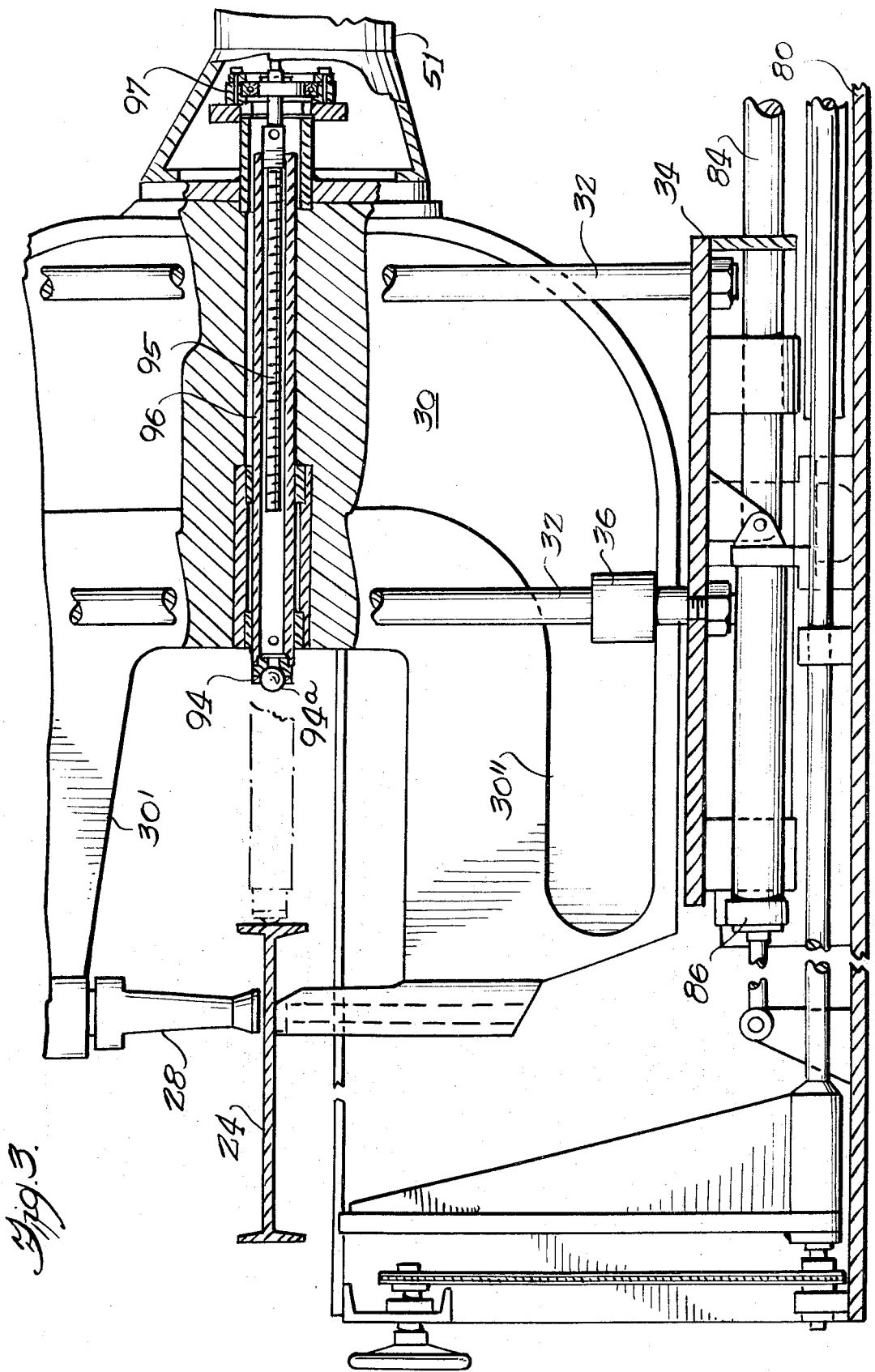

3,787,947

AUTO SPACE MECHANISM FOR FABRICATING APPARATUS

BACKGROUND OF THE INVENTION

This invention relates to an apparatus for use in the fabrication of elongated structural members or workpieces, such as angle irons, channel irons, I-beams, or the like. More particularly, the present invention provides novel apparatus for performing automatically a plurality of tooling operations at various locations spaced along a length of structural member. Each of the locations, for reference purposes is defined as an axis extending transversely of the longitudinal structural member with one or more of the tooling operations being performed at selected points on the transverse axis. Programmed fabricating apparatus are available including systems for the fabrication of structural members. However, these systems utilize complex, highly sophisticated circuitry and programming apparatus. Accordingly, many fabricators and users of structural members, who would prefer to automate their existing equipment, or purchase new automatic equipment, have been dissuaded by the inherent economical disadvantages of the available system. More particularly, the precision programming and sensing means employed in these systems require an initial capital investment that is prohibitive in many cases. Also, due to the relative complexity of these systems, set-up time is lengthy, thus rendering the systems impractical for short production runs. Unfortunately, most fabricators are confronted primarily with relatively short production runs, such that the additional cost factors of these prior art systems cannot be justified. This is especially true since in most instances the tolerances that are to be maintained, while critical within certain limits, do not necessitate the precision built into available systems.

Accordingly, not having adequate, economically feasible equipment available, most fabricators resort to a manually controlled fabricating operation. That is, an operator controls the movement of the workpiece relative to a tooling station and with repeated reference to the detailed production drawings properly aligns the workpiece with respect to the work station. When this is accomplished, the fabricating apparatus is actuated. Next, the workpiece is repositioned to bring the next point at which the operation is to be performed into alignment with the tooling station and the cycle repeated again. However, this mode of fabrication requires constant attention of an operator, as well as repeated and time-consuming checks and cross-checks with the production drawings.

SUMMARY OF THE INVENTION

Accordingly, it is an object of this invention to provide an apparatus which is capable of allowing substantial time savings in the fabrication of structural members as the result of substantially automatic operation of positioning of the tooling station with respect to the structural member.

More specifically, the present invention is of particular usefulness when performing operations on I-beams wherein a pattern or series of holes are to be formed through the web portion thereof. These holes are formed at various locations spaced along the length of the beam, which, for reference purposes, will be referred to hereinafter as the transverse or Y-axis of the beam, it being understood that the longitudinal axis of the beam is the X-axis. In addition, the spacing of the points on repeated transverse axes may vary from location to location, such that the apparatus must be able to accommodate these variations. Further, it is to be realized while the following detailed description of the invention, as well as the accompanying drawings, are connected with a punching operation, the invention may be employed in other types of tooling structures.

Accordingly, the present invention concerns novel apparatus which permits the fabricator to automate his equipment without a large capital investment for complex control systems. More specifically, the advantages and improvements afforded by the present invention are attained by the provision of apparatus including a work station, positioning means for orienting a workpiece with respect to the work station, and control means for effecting operation of the apparatus at a proper point in the fabricating cycle. Various components which comprise the novel apparatus of this invention include a stepping motor and control circuit therefor for positioning a transversely extending sensing probe which automatically positions a tool at the precise transverse location across the web of a structural member.

Therefore, many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is an elevational view of a tooling station of a fabricating apparatus as constructed in accordance with the principles of this invention;

FIG. 2 is a partial, top plan view illustrating a typical series or pattern of holes which may be formed in the web portion of an elongated structural member; and FIG. 3 is an enlarged fragmentary end elevational view, similar to FIG. 1, and partially in sectional view to illustrate more details of the structure.

DETAILED DESCRIPTION OF THE ILLUSTRATED EMBODIMENT

Referring now to FIG. 1 there is seen the general construction of a tooling station designated generally by reference numeral 10 and constructed in accordance with the principles of this invention. The tooling station 10 is here illustrated as including a punching apparatus 28 for forming apertures in the web portion of an I-beam 24 as illustrated. Positioned in front of the work station 10 is a transport conveying mechanism to accommodate an elongated structural member during transport thereof past the work station. The I-beam 24 is supported on a frame or stand (not shown) and is operatively engaged by drive means (also not shown) capable of producing controlled longitudinal movement of the I-beam relative to the tooling station. In the illustrated embodiment, the tooling station 10 employs tooling means in the form of a punch 28 and suitable dies associated therewith. However, it will be understood that any other suitable tooling means may be associated with the work station here illustrated.

By way of background, the I-beam 24, as well as other structural members capable of fabrication by use of the apparatus of the present invention, are used in the erection of buildings and other structures. In this regard numerous apertures 26, FIG. 2, must be formed in the members to provide for interconnection during assembly. Most frequently, it is necessary that a plurality of apertures in a prescribed pattern be formed at the end of the I-beam and at various locations along the length thereof. However, from one I-beam to another the patterns may vary as to the location along the length of the beam, and with regard to the arrangement of the patterns of holes at particular locations. That is, at one location, five apertures evenly spaced across the width of the web of the beam may be required, while at another location, only two or so apertures may be required, either evenly or unevenly spaced apart.

While a high degree of accuracy is not absolutely necessary in the placement of the apertures 26, it is necessary that their positioning be sufficiently controlled so that these apertures align with corresponding apertures formed in mating structural members to be connected thereto. Thus, the problem resolves itself into that of properly positioning the punch head 28 with respect to the I-beam for the formation of each aperture. This problem is complicated somewhat by the fact that in rolling or forming the I-beam, a "beam camber" is generally encountered, that is, the beam will have a slight curvature along its entire length rather than being absolutely straight as preferably desired. However, as will be readily understood, the flange portions of the beam may be used as a reference along the entire length thereof so that dimensioning from the flange will produce a desired repeatable result with respect to positioning apertures along the transverse axis of the I-beam.

In FIG. 2, there are illustrated typical patterns of holes 26 that may be formed in the end of the I-beam 24. It is to be kept in mind, that these patterns are closely spaced in FIG. 2 for purposes of illustration, and in practice the distance between the transverse axes across the web portion of the beam may vary to many different desired dimensions. For reference purposes, each hole 26 is located by the intersection of an X-axis and a Y-axis, the former being disposed longitudinally of the I-beam and the latter being the transverse axis. In the illustration of FIG. 2 the five X-axes are illustrated and labeled $X_1$–$X_5$, while only three Y-axes are labeled $Y_1$–$Y_3$, as shown. If the pattern of holes 26 along each of the transverse Y-axes are to be the same, a control circuit 50 will automatically produce the necessary control pulses to a stepping motor 51 to control the extension of a probe 94 which engages the flange portion of the I-beam 24. The automatic control of the control circuit 50 spaces the punching station 10 at the desired transverse location along the Y-axis while the I-beam is in a fixed position in front of the work station.

During the fabricating cycle, it is necessary to attain both longitudinal and transverse movement of the I-beam 24 relative to the tooling station 10 so as to position properly the punch head 28 at the exact intersection of the X and Y axes. This operation is clearly set forth in a related application Ser. No. 94,474, filed Dec. 2, 1970, U.S. Pat. No. 3,712,161. The improvement of this invention over that as set forth in the above-mentioned application is that the positioning of the probe 94 is accomplished by means of a simple and efficient stepping motor 51 connected to the control circuit 50. By using a stepping motor 51 even more accurately obtainable dimensioning of the transverse positioning is obtainable. This is because stepping motors have finely controlled rotatable motion which is divided into a plurality of arcuate segments. By connecting suitable gearing to the motor a given fraction of a rotation or a number of rotations will cause precise positioning of the probe 94 with respect thereto.

Referring again to FIG. 1, the tooling station 10 includes a C-shaped frame member 30 which carries the punch head 28 on the upper arm 30' thereof and is mounted for vertical movement on a plurality of guide rods 32 which pass through associated slide guides 36 formed on the frame 30. The guide rods 32 are secured to an upper plate 38 and at their lower end to a lower plate 34. A housing 40 is disposed upon the plate 38 and contains therein the necessary drive arrangement designed for effecting vertical positioning of the C-frame 30, and correspondingly, actuation of the punch head 28, the details of the drive means within the housing 40 not being necessary for a full understanding of the present invention. For the present, it is sufficient to realize that the upper portion of the C-frame 30 includes a vertically extending rod 42 which is threadedly engaged with drive means mounted within the housing 40 such that the frame may be raised and lowered in order to position the punch head properly with respect to the web portion of the I-beam 24. The threaded rod 42 functions in a well-known manner.

The work station 10 is mounted upon a stationary base unit 80 preferably which is anchored to a floor structure or the like. The base 80 has a pair of spaced apart rod blocks 82 which support a pair of horizontal guide rods 84 extending therefrom, each of said guide rods being received within a guide bearing unit 86 secured to the base platen 34 of the structure. The base platen 34 and the punch head 28, which is carried by the C-frame 30, are mounted for slidable movement transversely of the path of longitudinal movement of the I-beam 24.

The apparatus for attaining the initial positioning of the punch head 28, as well as that utilized for subsequent indexing of the punch head is more clearly illustrated in FIG. 3. The spacing of the apertures 26 on any given transverse Y-axis is generally some multiple of a given vlaue "A" which is represented by the spacing between the individual longitudinally extending axes $X_1$–$X_5$. Accordingly, initial positioning of the punch head 28 must be effected relative to some datum point and, then the punch is indexed through a distance "A" or some even integer multiple thereof. The particular details of the function of the punch positioning is illustrated in application Ser. No. 94,474, filed Dec. 2, 1970, U.S. Pat. No. 3,712,161.

Referring now to FIG. 3 the stepping motor 51 is operatively connected to the probe 94 by means of a threaded shaft 95 engaging the threaded end portion of a hollow tubular member 96. The stepping motor includes a bearing support unit 97 for maintaining a central axis between the motor and the threaded shaft 95. The end of the probe 94 is provided with a roller ball 94a which engages the flange of the structural member 24, as shown in phantom lines.

The desired position of the probe 94 is then interpreted into electrical signals from the control circuit 50 and delivered to the stepping motor 51 so as to cause extension of the probe 94 a given dimension. Once the probe 94 is properly extended the control unit 40 is actuated to cause transverse movement of the entire work station so that the probe engages the flange portion of the I-beam thus stopping the punch unit 28 at the desired location along the transverse axis thereof.

During the auto space mode of operation of the control circuit 50 the stepping motor 51 is controlled and the control mechanism 40 for the punch unit 28 is operated in response to the auto space circuitry. This produces automatic punching of the plurality of holes along a given transverse axis once the first hole location is obtained.

A typical sequence of operation is as follows: the number of holes and the dimensions between holes are set in the auto space switches associated with the control circuit 50. The operator locates the position of the first hole by operating the stepping motor to cause the web punch to move in or out. The operator does this by appropriately depressing the web punch gauge (IN-OUT switch) and observing an associated magnified mechanical scale located at the front of the machine. The operator then depresses the auto space start switch. The control circuit 50 then cooperates with the punch unit 28 to control its operation and to change the transverse position of the entire C-frame 30. When the first punch operation is completed, the web punch automatically moves to the desired location set in the auto space control circuit, this movement being either in an inward or an outward direction. Therefore, the control circuit of this invention allows the punch unit 28 to function in both directions during the auto space mode so as to minimize the time required between punching holes of spaced apart transverse axes. The web punch will travel the distance set into the auto space control and then stop. The circuitry commands the web punch to operate its actuation to form the holes within the web. This sequence of operation is repeated until the number of holes set into the auto space switches are punched thus completing the cycle.

If the auto space (number of holes) selector switch is set at zero the operator can depress the auto space start switch and the web punch will not punch any holes at all. However, the auto space control circuit will cause movement of the punch along the transverse axis to the desired locations. If a pin punch marking is desired the punch unit 28 may be so provided so that rather than punching holes completely through the transverse axis locations only pin punch markings are obtained. This is all precisely controlled in response to the energization of the stepping motor 51.

Accordingly, what has been described is a simple and efficient means for controlling the transverse dimensioning of the web punch of a beam punching mechanism. While a single specific embodiment of the invention is disclosed, it will be understood that other suitable variations and modifications may be effected without departing from the spirit and scope of the novel concepts disclosed and claimed herein.

We claim:

1. A machine for use in a fabricating cycle wherein a series of tooling operations are performed on an elongated workpiece, said operations being performed at predetermined points on selected axes extending transversely of the longitudinal axes of the elongated workpiece, said machine comprising: a work station including tool means for performing said tooling operation, and means supporting said tool means for movement along a path disposed transversely of the longitudinal axis of the workpiece, advancing means for effecting relative longitudinal movement of said workpiece with respect to the work station, such that a selected one of said transverse axes may be aligned with the transverse movement of said tool means, and apparatus for properly positioning and then operating said tool means at points on said transverse axis, said apparatus including a stepping motor and control circuit therefor operatively associated with said tool means and capable of indexing said tool means to the points on said transverse axis at which the tooling operations are to be performed, said apparatus further including reciprocal means capable of selective operative connection and disconnection with said tool means so that selective movement of said tool means in a desired direction may be obtained, said movement being limited to increments which are controlled in response to energization of said stepping motor, said control means operative for actuating said stepping motor and correlating the operation of said tool means when positioned at the desired points along the selected transverse axis.

2. The machine as defined in claim 1 wherein said control circuit includes control circuit function selector means associated therewith to select automatic spacing operations of the tool means for automatically positioning said tool means at predetermined spaced intervals along said transverse axis upon setting the initial starting condition.

3. The machine as defined in claim 2 wherein said automatic spacing operation is operative in both directions along said transverse axes so that tooling operations can be performed first in one direction along a given transverse axis and then similarly repeated when movement of said tool means is in the opposite direction along a second transverse axis.

4. The machine as defined in claim 1 wherein said apparatus for positioning said tool means further includes a probe extending from said stepping motor, said probe comprising a hollow body portion having a threaded end, a threaded shaft extending through said threaded end and rotatably connected to said stepping motor, whereby incremental rotation of said stepping motor will rotate said threaded shaft and cause expansion and contraction of said hollow body portion to position said probe means adjacent a flange portion of the workpiece being operated upon, thus limiting the extent of travel of said tool means along said transverse axis when said probe means engaging the flange of the workpiece.

* * * * *